United States Patent

Durbin, III

[15] 3,673,952
[45] July 4, 1972

[54] JUICE EXTRACTING DEVICE

[72] Inventor: George A. Durbin, III, 3rd & Fremont, Manhattan, Kans. 66502

[22] Filed: Feb. 16, 1971

[21] Appl. No.: 115,323

[52] U.S. Cl..............................100/98, 100/45, 100/102, 100/126, 100/215, 100/218, 100/245, 100/247, 100/268, 141/100, 141/361, 222/192
[51] Int. Cl......................................................B30b 15/08
[58] Field of Search..................141/100, 360, 361, 362; 222/135, 192; 100/94, 98, 39, 102, 268, 45, 126, 218, 240, 245, 251, 247, 244

[56] References Cited

UNITED STATES PATENTS

| 2,067,555 | 1/1937 | Walker | 100/98 |
| 2,345,683 | 4/1944 | Owens | 100/98 |
| 2,369,305 | 2/1945 | Lobasso | 100/218 X |
| 2,522,800 | 9/1950 | Quiroz | 100/218 X |
| 2,713,819 | 7/1955 | Lingle | 100/268 X |
| 3,162,114 | 12/1964 | Quiroz | 100/218 X |

FOREIGN PATENTS OR APPLICATIONS

| 771,484 | 10/1934 | France | 100/102 |

*Primary Examiner*—Billy J. Wilhite
*Attorney*—Fishburn, Gold & Litman

[57] ABSTRACT

A device for extracting juice from citrus fruit and for use with a beverage dispensing device including a housing having a fruit entrance to receive fruit from a hopper-shaped member and a piston reciprocable within the housing to effect cutting and squeezing of citrus fruit by moving citrus fruit into engagement with a fixed blade and a resiliently mounted abutment member which then moves cut and squeezed fruit through a fruit exit of the housing and into a beverage container adjacent the beverage dispensing device upon movement of the piston to a release position, all in response to activation of the beverage dispensing device.

10 Claims, 4 Drawing Figures

INVENTOR.
George A. Durbin III

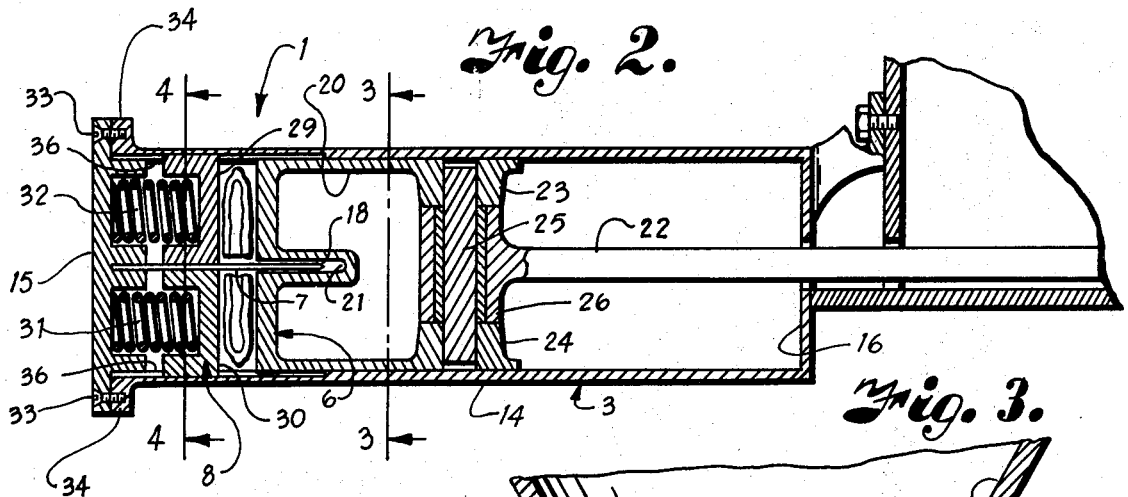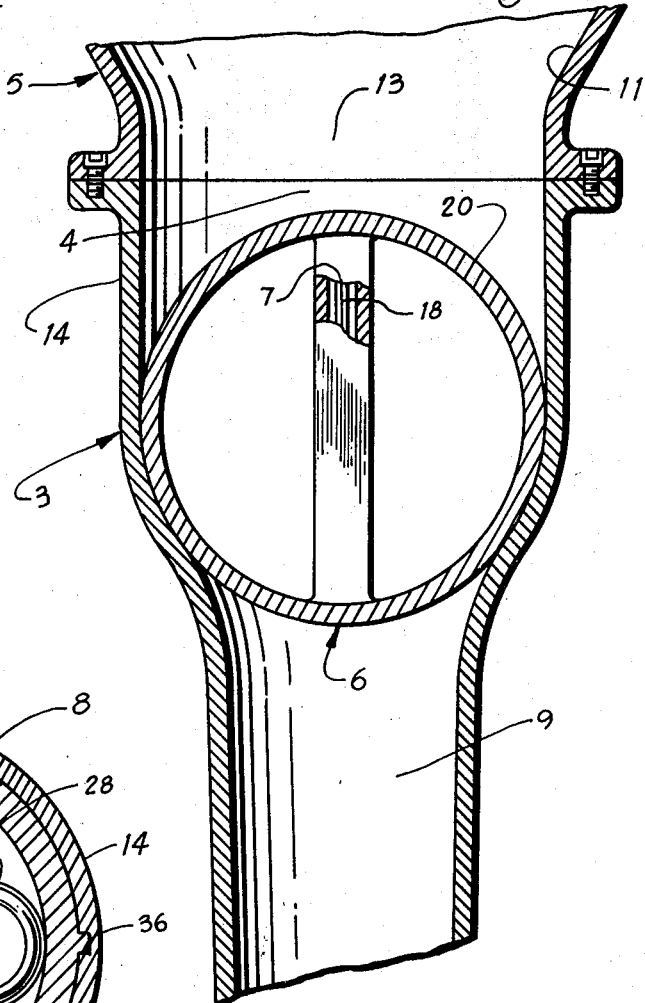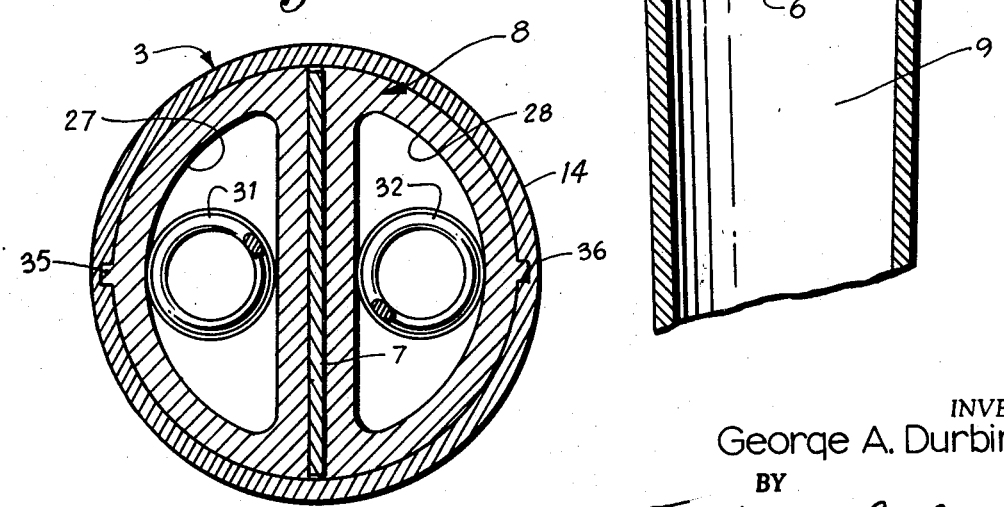

JUICE EXTRACTING DEVICE

The present invention relates to devices for extracting juice from citrus fruit and more particularly to such a juice extracting device for use in conjunction with a beverage dispensing device.

The principal objects of the present invention are: to provide a juice extracting device for use with a beverage dispensing device and which is operative to cut and squeeze citrus fruit and to deposit the cut and squeezed citrus fruit and juice therefrom into a beverage container adjacent the beverage dispensing device upon activation of said beverage dispensing device; to provide such a juice extracting device which is operative to automatically feed and cut and squeeze and eject citrus fruit and juice therefrom in response to activation of a beverage dispensing device; to provide such a juice extracting device having resiliently mounted abutment members therein to cushion a cutting and squeezing movement of a piston and to eject cut and squeezed citrus fruit and juice therefrom; to provide such a juice extracting device wherein the fruit engaging portions thereof are removable for cleaning; to provide such a juice extracting device having a piston movable to close a fruit entrance to the device during cutting and squeezing of citrus fruit therein; and to provide such a juice extracting device which is economical to manufacture, durable in construction, positive in operation, and particularly effective for the proposed use.

Other objects and advantages of this invention will become apparent from the following description taken in connection with the accompanying drawings wherein are set forth by way of illustration and example, certain embodiments of this invention.

The drawings constitute a part of this specification and include an exemplary embodiment illustrating various objects and features of the juice extracting device of the present invention.

FIG. 2 is a longitudinal sectional view taken on line 2—2, FIG. 1, and showing the component parts thereof in cutting and squeezing position.

FIG. 3 is a transverse sectional view taken on line 3—3, FIG. 2, and showing relative positions of a fruit entrance and fruit exit of a housing enclosing the operative parts and with a fruit moving piston positioned therebetween.

FIG. 4 is a transverse sectional view taken on line 4—4, FIG. 2, and showing relative positions of a fixed blade member and a resiliently mounted abutment member.

Figure 1:
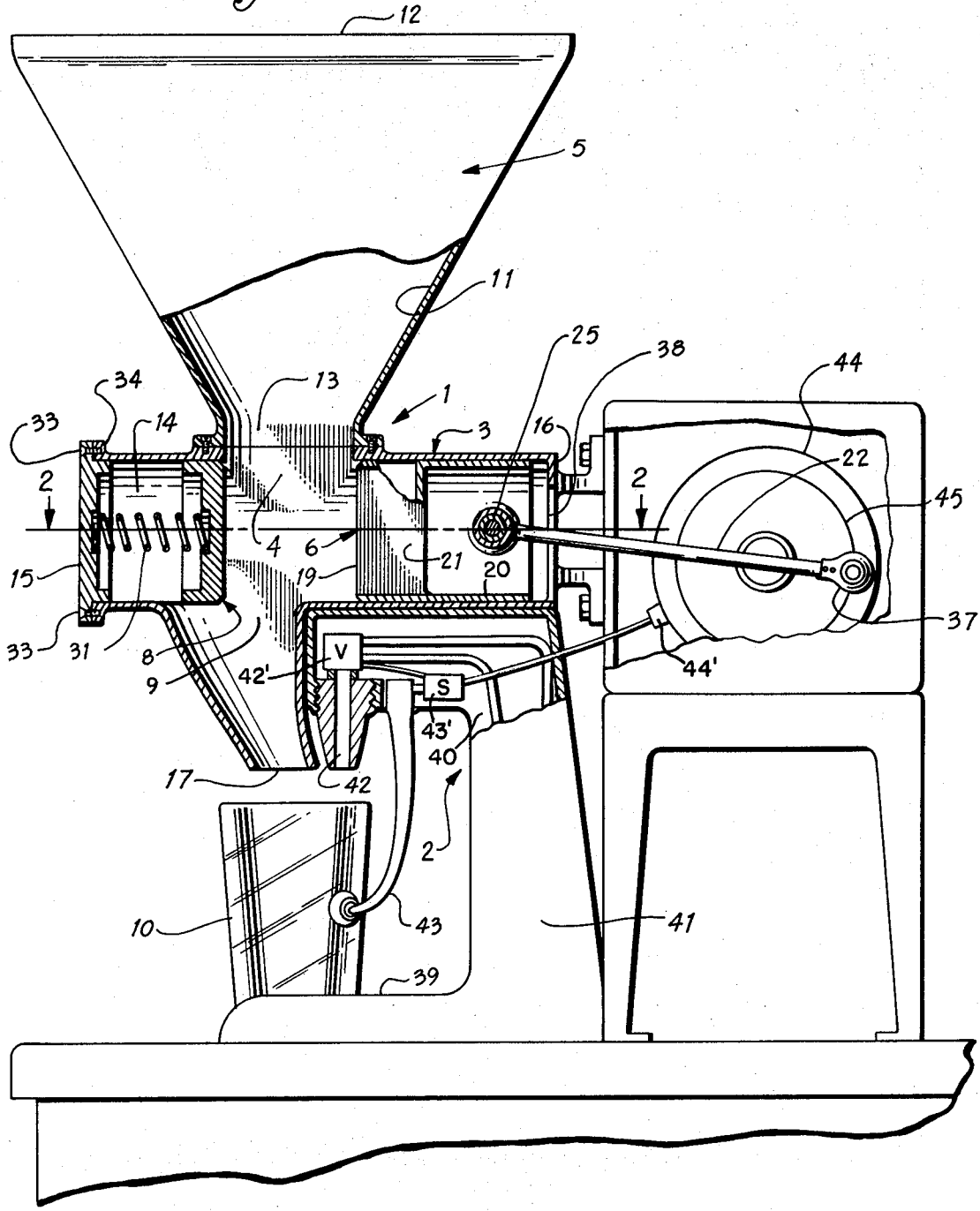
FIG. 1 is a side elevational view of a juice extracting device embodying features of the present invention and having portions broken away to better illustrate the component parts thereof and showing the component parts thereof in position to receive citrus fruit prior to cutting and squeezing same.

Referring more in detail to the drawings:

As required, detailed embodiments of the invention are disclosed herein, however, it is to be understood that the disclosed embodiments are merely exemplary of the invention which may be embodied in various forms that are different from those illustrative embodiments presented herein, therefore, specific structural and functional details disclosed herein are not to be interpreted as limiting but merely as a basis for the claims actually defining the scope of this invention. In this regard, it is to be recognized that juice extracting devices, in accordance herewith, may be embodied in various forms and furthermore that such juice extracting devices may be variously shaped and positioned relative to and supported on a beverage dispensing device. The disclosure hereof is presented only as a representative basis for teaching one skilled in the art to employ the present invention in virtually any appropriate detailed structure.

In the disclosed embodiment, the reference numeral 1 generally designates a device for extracting juice from citrus fruit and for use with a beverage dispensing device 2 and includes a housing 3 having a fruit entrance 4 to receive fruit from a hopper-shaped member 5 and a piston 6 reciprocable within the housing 3 for moving citrus fruit into engagement with citrus fruit cutting means in the form of a fixed blade 7 and stroke cushioning and fruit ejection means in the form of a resiliently mounted abutment member 8 which moves cut and squeezed fruit through a fruit exit 9 of the housing 3 and into a suitable beverage container 10 adjacent the beverage dispensing device 2 upon movement of the piston 6 toward a release position all in response to activation of the beverage dispensing device 2.

The hopper-shaped member 5 is mounted on the housing 3 and communicates therewith for automatically depositing citrus fruit therein upon activation of the beverage dispensing device 2. In the illustrated structure, the hopper-shaped member 5 has a downwardly and inwardly tapering side wall 11 defining a fruit entrance 12 at an upper end thereof and a fruit exit 13 at a lower end thereof and aligned with the fruit entrance 4 of the housing 3.

The housing 3 has movable fruit engaging means therein including the piston 6, blade 7, and abutment member 8 which are for cutting and squeezing citrus fruit deposited therein from the hopper-shaped member 5 and ejecting cut and squeezed fruit all upon each activation of the beverage dispensing device 2. The illustrated housing 3 has a side wall 14 extending between opposed closed ends 15 and 16 and having the fruit entrance 4 positioned intermediate the ends 15 and 16. The side wall 14 is preferably shaped to engage and be supported on an upper portion of the beverage dispensing device 2, as by having a suitable pocket or recess therein. The fruit exit 9 of the housing 3 is illustrated as a generally tubular portion depending from the side wall 14 and terminating at an open lower end 17 positioned immediately above a suitable beverage container 10 positioned to receive a beverage from the beverage dispensing device 2 and the juice and the cut and squeezed fruit.

The fixed blade 7 is suitably secured to one of the closed ends, as for example end 15, and extends therefrom and into the housing 3. The fixed blade 7 preferably has a suitable cutting edge 18 on the free edge thereof to be engaged by citrus fruit moved into engagement therewith by the piston 6.

The piston 6 has one face 19 which engages the citrus fruit deposited in the housing 3 through the fruit entrance 4 thereof and is movable between a cutting and squeezing position, as best illustrated in FIG. 2, and a release position, as best illustrated in FIG. 1. The illustrated piston 6 has an end wall at the one face 19 thereof and a side wall 20 extending therefrom. The end wall or one face 19 of the piston 6 has a recess 21 therein positioned to receive the fixed blade 7 when moving the citrus fruit into engagement with the abutment member 8 during and after cutting the citrus fruit. The side wall 20 of the piston 6 extends across the fruit entrance 4 when the piston 6 is in the cutting and squeezing position to thereby prevent additional citrus fruit from entering the housing 3 during the cutting and squeezing of the citrus fruit therein and the piston end wall or one face 19 is positioned to clear the fruit entrance 4 when the piston 6 is in the release position to permit fruit to enter the housing 3.

The piston 6 is illustrated as a generally tubular member and is operatively connected to suitable driving means, as later described, by a connecting rod 22 having respective opposite ends thereof pivotally connected to the piston 6 and the drive means. In the illustrated structure, the piston 6 has pin support means in the form of opposed bosses 23 and 24 extending inwardly from facing interior surfaces of the side wall 20 and the bosses 23 and 24 have aligned bores extending therethrough to receive a pivot pin 25 extending through a suitable bushing mounted in one end 26 of the connecting rod 22.

The abutment member 8 is effective to cushion a cutting and squeezing movement of the piston 6 and to permit cut and squeezed fruit and the juice to move downwardly through the fruit exit and is resiliently mounted within the housing 3 and positioned between one of the closed ends thereof, as for example closed end 15, and the piston 6 whereby reciprocation of the piston 6 effects cutting and squeezing of citrus fruit positioned between the abutment member 8 and the piston 6. In the illustrated structure, the abutment member 8 includes a pair of spaced side-by-side reciprocable slides 27 and 28 positioned on and preferably in engagement with opposite sides respectively of the fixed blade 7. The slides 27 and 28 have end walls 29 and 30 respectively positioned in facing relation with the end wall or one face 19 of the piston 6 whereby citrus fruit positioned therebetween will be cut and squeezed in response to the movement of the piston 6 toward the abutment member 8.

The slides 27 and 28 of the abutment member 8 are movable between a retracted position, as best shown in FIG. 2, and an extended position, as best shown in FIG. 1, and when in the extended position, the end walls 29 and 30 are positioned to clear the fruit entrance 4 of the housing 3 to permit citrus fruit to be deposited within the housing 3.

The resilient mounting of the abutment member 8 is illustrated as elongated resilient members in the form of compressible springs 31 and 32 for the slides 27 and 28 respectively. The compressible springs 31 and 32 each have respective opposite ends thereof secured to the closed end 15 of the housing 3 and the end walls 29 and 30 of the respective slides whereby during the cutting and squeezing of the citrus fruit, the slides 27 and 28 are moved toward the closed end 15 and when the piston 6 moves toward the other closed end 16, the springs 31 and 32 will move the end walls 29 and 30 of the slides 27 and 28 respectively beyond the cutting edge 18 of the fixed blade 7 to permit the cut and squeezed fruit to move through the fruit exit 9 and into the beverage container 10.

It is desirable to maintain the juice extracting device 1 in a sanitary condition, therefore, it is necessary to clean the fruit engaging portions thereof and in the illustrated structure, the closed end 15 of the housing 3 is removably mounted, as by suitable screws 33 extending through an end closure member defining the closed end 15 and into a suitable flange 34 of the housing 3. Removal of the screws 33 permits removal of the closure member 15, springs 31 and 32, slides 27 and 28, and the blade member 7 which is secured to the closure member 15. In the illustrated structure, the slides 27 and 28 are guided in their movement within the housing and during installation within and removal from the housing by suitable ribs 35 extending therefrom and which are received within suitable guideways 36 in interior surfaces of the side wall 14 of the housing 3.

It is also desirable to remove the piston 6 from the housing 3 for cleaning, therefore, an other end 37 of the connecting rod 22 is removably mounted on the drive means 21 and the other end 37 is sized to move through a slot 38 in the closed end 16 of the housing 3 whereby the piston 6 and connecting rod 22 may be moved outwardly through the housing 3 after removal of the closure member 15.

The illustrated beverage dispensing device 2 is supported on a suitable base 39 and includes a head portion 40 at an upper end of an upright portion 41 which has suitable electrical and mechanical apparatus and controls (not shown) therein to dispense a selected beverage through a nozzle 42 depending from the head portion 40 and positioned to direct a selected quantity of the beverage into the container 10 upon each activation of the beverage dispensing device 2, as by moving the container 10 into engagement with a suitable lever 43 depending from the head portion 40.

Movement of the lever 43 is effective to open a suitable valve 42' in beverage lines or conduits communicating with the nozzle 42 and to activate a suitable electrical circuit, as later described, having suitable relay means for activating the drive means to effect a stroke of the piston 6 from the release position to the cutting and squeezing position and return to the release position. Movement of the lever 43 by the beverage container 10, closes a suitable switch 43' which is electrically connected to the valve 42' whereby the valve 42' remains open while the beverage container 10 remains in a position engaging the lever 43. The switch 43' is preferably spring loaded to effect positive closing of the valve 42' when the beverage container 10 is moved out of engagement with the lever 43.

The illustrated drive means preferably include a suitable motor 44 and a gear reduction unit 45 having the other end 37 of the connecting rod 22 eccentrically and removably mounted thereon to thereby effect reciprocation of the piston 6. The movement of the lever 43 also energizes the motor 44. The switch 43' is electrically connected a suitable relay means 44' operatively connected to the motor 44 whereby the motor 44 is operated to effect one stroke of the piston 6.

In using a juice extracting device, constructed as illustrated and described, the desired type and size of citrus fruit is placed in the hopper-shaped member 5 and one fruit, such as a lemon or lime, moves through the fruit exit 13 of the hopper-shaped member 5 and through the fruit entrance 4 of the housing 3 to a position between the abutment member 8 and the piston 6. The fruit has one portion thereof positioned above the fruit exit 9 and the remaining portion supported on the side wall 14 adjacent the fruit exit 9 of the housing 3. The beverage container 10 is then moved into engagement with the lever 43 which is then moved rearwardly to activate the beverage dispensing device 2, as by opening a suitable valve (not shown) in the head portion 40 for a predetermined time to thereby dispense a selected quantity of the desired beverage. Moving the lever 43 also completes a suitable electrical circuit (not shown) having suitable relay means (not shown) therein to operate the motor 44 and gear reduction unit 45 to complete one stroke of the piston 6 as from the release position shown in FIG. 1, to the cutting and squeezing position shown in FIG. 2, and return to the release position. Forward movement of the piston 6, moves the fruit into engagement with the blade 7 thereby cutting the fruit and continued movement of the piston 6 moves the fruit portions into engagement with the abutment member 8 which is thereby moved toward the end closure 15 as the piston 6 completes a forward portion of its stroke. On the return portion of the stroke of the piston 6, the springs 31 and 32 urge the slides 27 and 28 of the abutment member 8 away from the closed end 15 thereby moving the cut and squeezed portions of the fruit beyond the blade 7 thereby permitting said cut and squeezed fruit portions to move downwardly through the fruit exit 9 of the housing 3 and into the beverage container 10.

It is to be understood that while I have illustrated and described one form of my invention, it is not to be limited to the specific form or arrangement of parts herein described and shown.

What I claim and desire to secure by Letters Patent is:

1. A juice extracting and beverage dispensing device comprising:
  a. means for selectively dispensing a beverage;
  b. means mounted on said beverage dispensing means for cutting and squeezing citrus fruit upon activation of said beverage dispensing means, said citrus fruit cutting and squeezing means having fruit engaging means movable between a cutting and squeezing position and a release position;
  c. means mounted on and communicating with said citrus fruit cutting and squeezing means for depositing citrus fruit therein upon activation of said beverage dispensing means; and
  d. drive means operatively connected to said beverage dispensing means and to said citrus fruit cutting and squeezing means for moving said fruit engaging means from the release position to the cutting and squeezing position and return to the release position upon activation of said beverage dispensing means.

2. A juice extracting device as set forth in claim 1 wherein said citrus fruit cutting and squeezing means comprises:
  a. a housing having opposed closed ends and a fruit entrance and a fruit exit positioned therebetween;
  b. fixed blade means adjacent one of the closed ends of said housing and extending therefrom;
  c. a piston reciprocable within said housing and having a blade receiving recess in one f.. .e thereof; and d. resiliently mounted abutment means positioned between said one closed end of said housing and said piston whereby reciprocation of said piston effects cutting and squeezing of citrus fruit positioned between said abutment means and said piston.

3. A juice extracting device as set forth in claim 2 wherein:
a. said abutment means comprises a pair of spaced side-by-side reciprocable slides positioned on opposite sides of said fixed blade means;
b. each of said slides has an end wall positioned in facing relation with an end wall at one face of said piston; and
c. the resilient mounting of said slides comprises an elongated resilient member for each slide, each resilient member having respective opposite ends thereof secured to said one closed end of said housing and to the end wall of the respective slide.

4. A juice extracting device as set forth in claim 2 wherein:
a. said abutment means is movable between a retracted position and an extended position;
b. said abutment means has portions positioned to clear the fruit entrance of said housing when in the extended position;
c. said piston is movable between the cutting and squeezing position and the release position;
d. said piston has an end wall at the one face thereof and a side wall extending therefrom; and
e. said piston side wall extends across the fruit entrance of said housing when in the cutting and squeezing position to prevent fruit from entering said housing and said piston end wall is positioned to clear the fruit entrance when in the release position to permit fruit to enter said housing.

5. A juice extracting device as set forth in claim 2 wherein:
a. said one end of said housing comprises a removably mounted end closure member having said blade means fixedly mounted thereon and extending therefrom and into said housing;
b. said abutment means comprises a pair of spaced side-by-side reciprocable slides positioned on opposite sides of said fixed blade means and each having an end wall positioned in facing relation with an end wall at the one face of said piston and
c. the resilient mounting of said slides comprises an elongated resilient member for each slide and each having respective opposite ends thereof secured to said end closure member and to the end wall of the respective slide whereby said slides and said blade means are removable from said housing.

6. A juice extracting device for use with a beverage dispensing device and comprising:
a. means mounted on a beverage dispensing device for cutting and squeezing citrus fruit upon activation of the beverage dispensing device, said citrus fruit cutting and squeezing means having fruit engaging means therein and movable between a cutting and squeezing position and a release position;
b. means mounted on and communicating with said citrus fruit cutting and squeezing means for storing and depositing citrus fruit in said cutting and squeezing means upon activation of the beverage dispensing device;
c. drive means operatively connected to said citrus fruit cutting and squeezing means and to the beverage dispensing device for moving said fruit engaging means from the release position to the cutting and squeezing position and return to the release position for each activation of the beverage dispensing device; and
d. means associated with and extending from said cutting and squeezing means for directing cut and squeezed fruit therefrom and into a container adjacent the beverage dispensing device.

7. A juice extracting device as set forth in claim 6 wherein:
a. said citrus fruit depositing means comprises a hopper-shaped member having a fruit entrance and a fruit exit;
b. said citrus fruit cutting and squeezing means and said movable fruit engaging means therein comprises a housing having opposed closed ends and a fruit entrance and a fruit exit positioned therebetween and a blade member fixedly mounted adjacent one of the closed ends and extending therefrom and a piston reciprocable within said housing and having a blade receiving recess in one face thereof; and
c. said fruit exit of said hopper-shaped member and said fruit entrance of said housing are aligned and said piston has a side wall movable to close said fruit entrance of said housing when in said cutting and squeezing position.

8. A juice extracting device as set forth in claim 7 including resiliently mounted abutment means positioned between one of said closed ends of said housing and said piston whereby reciprocation of said piston effects cutting and squeezing of citrus fruit positioned between said abutment means and said piston upon movement of said piston toward the cutting and squeezing position and ejection of cut and squeezed fruit upon movement of said piston away from the cutting and squeezing position to the release position.

9. A juice extracting device as set forth in claim 8 wherein said resiliently mounted abutment means comprises:
a. a pair of spaced side-by-side reciprocable slides positioned on opposite sides of said blade member, said slides each having an end wall positioned in facing relation with the one face of said piston; and
b. an elongated resilient member for each slide and each having respective opposite ends thereof secured to the end wall of the respective slide and to the one closed end of said housing.

10. A juice extracting device as set forth in claim 9 wherein:
a. the one closed end of said housing comprises a removably mounted end closure member having said blade member fixedly mounted thereon and extending therefrom and into said housing; and
b. said piston is operatively connected to said drive means by a connecting rod having respective opposite ends pivotally connected to said piston and said drive means, the end of the connecting rod connected to said drive means is selectively removable therefrom whereby said blade member and slides and piston are removable from said housing.

* * * * *